US012628931B2

(12) United States Patent
Hodge

(10) Patent No.: US 12,628,931 B2
(45) Date of Patent: May 19, 2026

(54) APPARATUS AND METHOD FOR TRACING AND TRIMMING HAIRLINE

(71) Applicant: Morono Hodge, Washington, DC (US)

(72) Inventor: Morono Hodge, Washington, DC (US)

(*) Notice: Subject to any disclaimer, the term of this patent is extended or adjusted under 35 U.S.C. 154(b) by 535 days.

(21) Appl. No.: 16/868,920

(22) Filed: May 7, 2020

(65) Prior Publication Data

US 2021/0345753 A1 Nov. 11, 2021

(51) Int. Cl.
*A45D 24/36* (2006.01)
*B26B 19/38* (2006.01)
*A45D 24/00* (2006.01)

(52) U.S. Cl.
CPC .......... *A45D 24/36* (2013.01); *B26B 19/3806* (2013.01); *A45D 2024/002* (2013.01)

(58) Field of Classification Search
CPC ................ A45D 8/36; A45D 2007/007; A45D 2024/002; A45D 24/36; B26B 19/3806; B26B 19/3826
See application file for complete search history.

(56) References Cited

U.S. PATENT DOCUMENTS 1,013,077 A 12/1911 Sharrow
1,544,868 A * 7/1925 Sprengnether ......... A45D 24/36 132/214
1,627,469 A * 5/1927 Syptroth .................. A45D 8/36 132/54
1,907,063 A * 5/1933 Golanke ................ A45D 24/36 132/214
2,171,019 A * 8/1939 Zupnyk .................... A45D 8/00 132/273
2,176,880 A 10/1939 Bleckmann
2,558,516 A * 6/1951 Granberg ............... A45D 24/36 132/213
2,771,081 A * 11/1956 Shirmeyer ............. A45D 24/36 132/54
2,808,840 A 10/1957 Santis
2,917,055 A 12/1959 Fouche
2,932,303 A * 4/1960 Smith .................... A45D 24/36 132/214
5,946,728 A * 9/1999 Tane ........................ A45D 8/34 63/3
6,267,119 B1 7/2001 Silva
7,559,331 B2 7/2009 Ward
9,925,676 B2 3/2018 Krenik
10,265,875 B1 4/2019 Krenik
2004/0074511 A1 4/2004 Sussan
2005/0217687 A1 10/2005 Flanick
2007/0246059 A1* 10/2007 Jensen ..................... A45D 8/34 132/273

(Continued)

OTHER PUBLICATIONS

Merriam-Webster's Collegiate Dictionary 1436 (11th ed. 2012).*

*Primary Examiner* — Nicholas D Lucchesi
*Assistant Examiner* — Jennifer Gill
(74) *Attorney, Agent, or Firm* — Winston & Strawn LLP

(57) ABSTRACT

The present invention, also referred to as bow finder, provides a barber instrumentality useful for accurate and straight outlining of a person's hairline, particularly the forehead hairline. Methods are also provided herein for the use of the instrumentality wherein precise use of the outlining wire can ensure that a barber or stylist is trimming hair straight and balanced in position to the reciprocal part on the opposite side of the head.

5 Claims, 4 Drawing Sheets

(56) References Cited

U.S. PATENT DOCUMENTS

| | | | | |
|---|---|---|---|---|
| 2008/0041098 | A1* | 2/2008 | Lafauci | A45D 8/36 63/3 |
| 2013/0087164 | A1 | 4/2013 | Thomas | |
| 2015/0216282 | A1* | 8/2015 | Rush | A45D 8/36 132/275 |
| 2017/0013930 | A1* | 1/2017 | Millan | A45D 8/36 |

* cited by examiner

APPARATUS AND METHOD FOR TRACING AND TRIMMING HAIRLINE

FIELD OF THE INVENTION

The invention relates to the field of styling hair in general, and more particularly, relates to apparatus and methods for creating accurate and balanced outlining and trimming of a person's hairline.

BACKGROUND OF THE INVENTION

Hair styling involves techniques that require creativity and technical precision. Training and experience are paramount to being successful at hair styling. However, even the most highly trained and experienced stylist must deal with difficult hair styles on a daily basis and with customers that request and expect precision cuts and styles. One specific challenge to many stylists or barbers is the need to accurately and reproducibly trim a customer's hairline, such as the forehead hairline, in a consistent manner depending on the type of hairline or a customer's desired shape of the hairline. For example, different types of natural forehead hairlines include, but are not limited to, high and broad, low and narrow, straight and square, rounded, and widow's peak. Creating a haircut consistent with the natural forehead hairline or with a customer's particular desired shape presents unique difficulty, given the lack of useful measuring tools to ensure reproducibility.

Of particular concern for a stylist or barber are those customers that have very short hair, where slight imperfections in shape or angles of the hairline are highly noticeable and undesirable. For decades, clients have asked barbers for a shape-up, also known as a line-up, which is a hairstyle that involves cutting along the nature hairline to make it straight. Techniques such as using a tape measure or string, do not allow for a barber to create a hairline that follows the natural curvature of the forehead hairline or other unique shape desired by the customer. With respect to a tape measure or string in particular, when these devices are looped around a person's head, they cannot be shaped, fail to hold a particular shape, and/or fail to stay in place.

Likewise, even the most experienced barber cannot guarantee a straight or consistent trim along the forehead hairline by solely relying on freehand work or the guidance of a comb. For instance, prior devices, like U.S. Pat. No. 6,267,119, provide a curved edged comb that can be used as a guide or clamps to an individual's hair to assist in cutting hair in a straight line. However, the comb cannot be affixed to an individual's head and hold its shape, allowing for misalignment to occur. The comb is also designed to clamp to longer hair and is not effective in cutting the hairline of shorter hair. Further, the comb would be ineffective at accurately reproducing the wide range of forehead and hairline shapes.

Other prior art devices, such as U.S. Pat. No. 2,176,880, are designed to reproduce a particular length of hair measured from the scalp, and would not be effective at trimming a hairline along the forehead along the natural curvature or other desired shape.

Some prior art devices, such as U.S. Pat. App. Pub. 2005/0217687, are designed to cut longer hair such as bangs. The '687 Publication, for example, requires a strip of material with an adhesive that is applied to an individual's skin on the forehead, neck, or back. The hair hangs over the strip allowing the hair to be cut in a line. This device is not effective at cutting short hair along the natural curvature of the forehead hairline or other unique shape desired by the customer because the device cannot overlay the hairline (i.e., the device has to be adhered to the individual's skin).

The present invention seeks to overcome these deficiencies in prior devices.

SUMMARY OF THE INVENTION

The present invention provides a novel styling tool that provides a user with a precise outline of a person's hairline, and particularly the forehead hairline, and the ability to cut or trim consistently along the natural hairline or otherwise in an accurate shape along the hairline. The invention includes a shapeable but firm wire. There can be two small loops present at each end of the wire to avoid sharp ends since the invention is used around persons' eyes.

The invention establishes accuracy and balance. The wire preferably includes fixed reference points along the wire. The reference marks can include a mark in the center of the wire and any number of additional reference marks placed on both sides of the center mark and spaced, for example, equidistant apart. The different reference marks on the wire allow the barber to measure distance of different points along the hairline. For example, the reference marks can be used to determine where the edges of the shape-up and/or outline should start, such as the temporal points and the apexes of the front-temporal recesses along the forehead hairline. Thus, the invention can determine if certain points along the forehead hairline are in the correct proportions (e.g., balanced along the hairline on both sides of the forehead) by establishing the distance from the center of the forehead hairline above the center of the nose (i.e., mid-frontal point).

In a preferred embodiment, one end of the wire is looped past the other end of the wire, creating an oval or circular shape with the wire, called a bow for the purposes of this invention. In the preferred embodiment, the barber secures the bow onto the top of the client's head, aligning the center reference mark on the wire with the mid-frontal point of the forehead hairline. In the preferred embodiment, the bow is adjusted to fit the correct curvature around the perimeter of the client's head and can hold its shape without the aid of the barber. The firmness of the wire of the invention allows it to hold its form such that the barber can secure the wire around the perimeter of the client's head in a particular shape. The adaptability or shapeable nature of the wire allows the barber to then manipulate the wire to create a particular shape, including one that follows the natural curvature of the forehead hairline or other unique shape desired by the customer. When the wire is looped, squeezed, or bent, for example, it maintains its shape such that it can be used to outline different hairlines, including those that are generally consistent with a wide range of natural forehead hairline shapes. Once fit around the perimeter of the client's head and shaped, the firmness of the wire allows the formed shape to stay fixed around the perimeter of the client's head and maintain the desired shape along the forehead hairline. In the preferred embodiment, the barber then cuts any hair protruding out under the wire following the outline created by the wire.

The foregoing and other features and advantages of the present invention become further apparent by reference to the following drawings and descriptions.

BRIEF DESCRIPTION OF THE DRAWINGS

For the present invention to be clearly understood and readily practiced, the present invention will be described in conjunction with the following figures, wherein.

Figure 1:
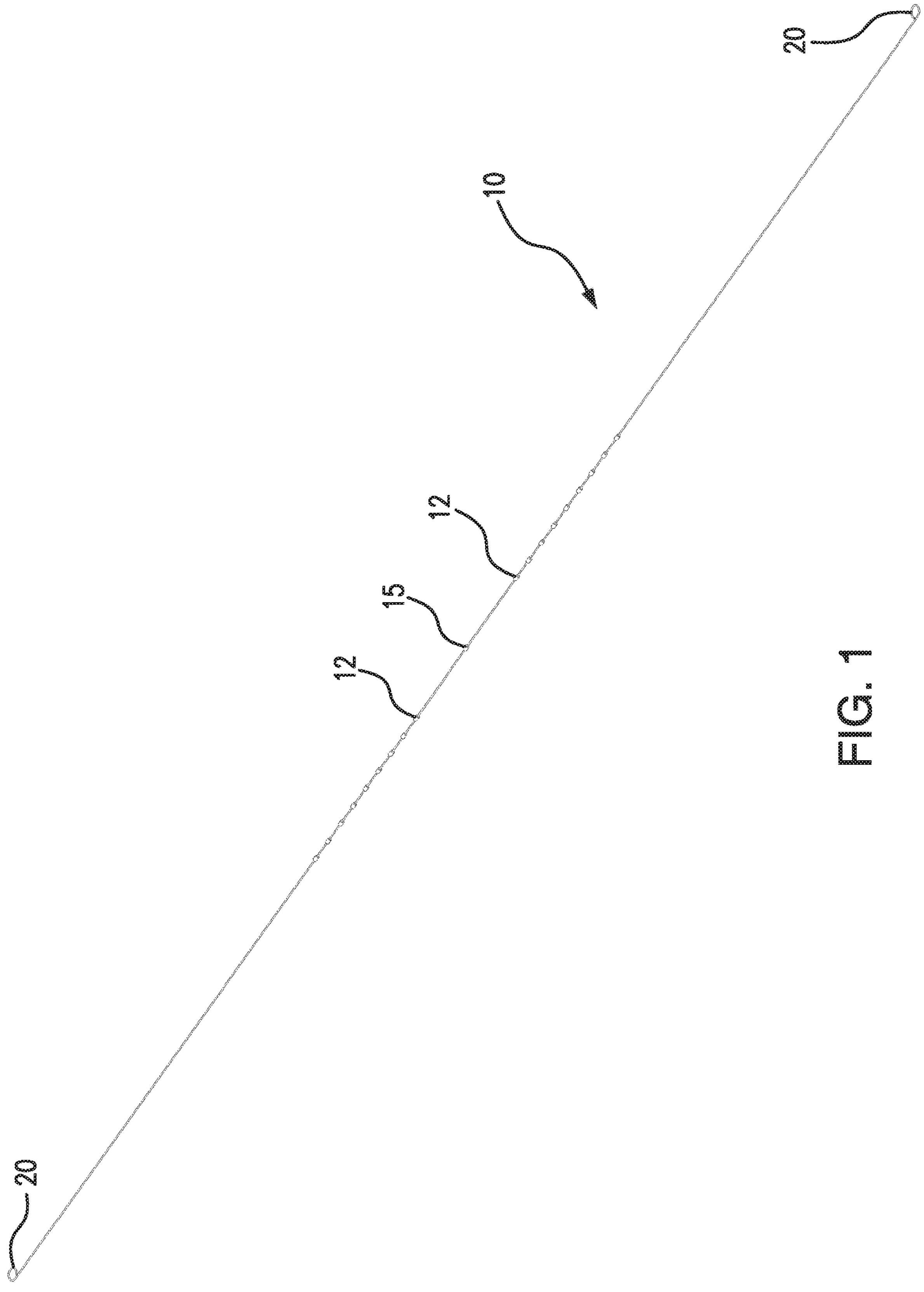
FIG. 1 is a side view of one embodiment of the invention in a linear configuration.

The components in the figures are not necessarily drawn to scale, emphasis instead being placed upon illustrating the principles of the invention. Moreover, in the figures, like reference numerals designate corresponding parts throughout the different views. However, like parts do not always have like reference numerals. Furthermore, all illustrations are intended to convey concepts, where relative sizes, shapes and other detailed attributes may be illustrated schematically rather than literally or precisely.

DESCRIPTION OF ILLUSTRATIVE EMBODIMENTS

Figure 2:
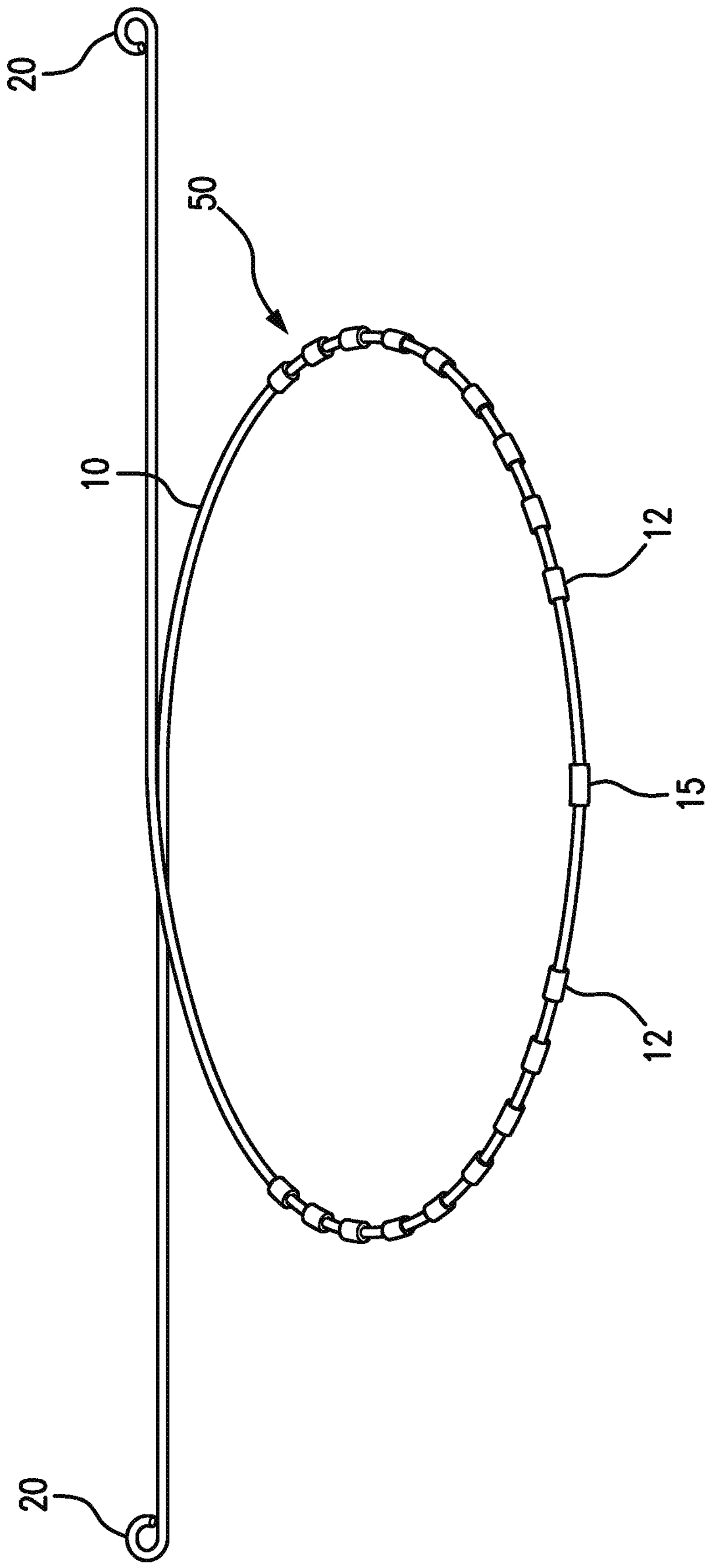
FIG. 2 is a top view of one embodiment of the invention in the bow configuration.

In a preferred embodiment, the novel invention is illustrated by FIG. 1, where a head wire (10) includes a plurality of marks (12) that extend from a center reference mark (15) in a pre-measured fashion. The marks (12 and 15) can be notches, grooves, threads, beads, or any other indicators along the wire (10). While the marks (12 and 15) can be spaced any distance apart, marks (12) are preferably spaced two (2) inches on either side of the center reference mark (15) and one-half (½) inch apart from each other. The wire (10) can be made of any material that is firm but shapeable, but preferably is made of metal. Preferably, there are two small loops (20) at each end of the wire (10). FIG. 2 shows the preferred embodiment in a bow configuration (50).

Figure 3:
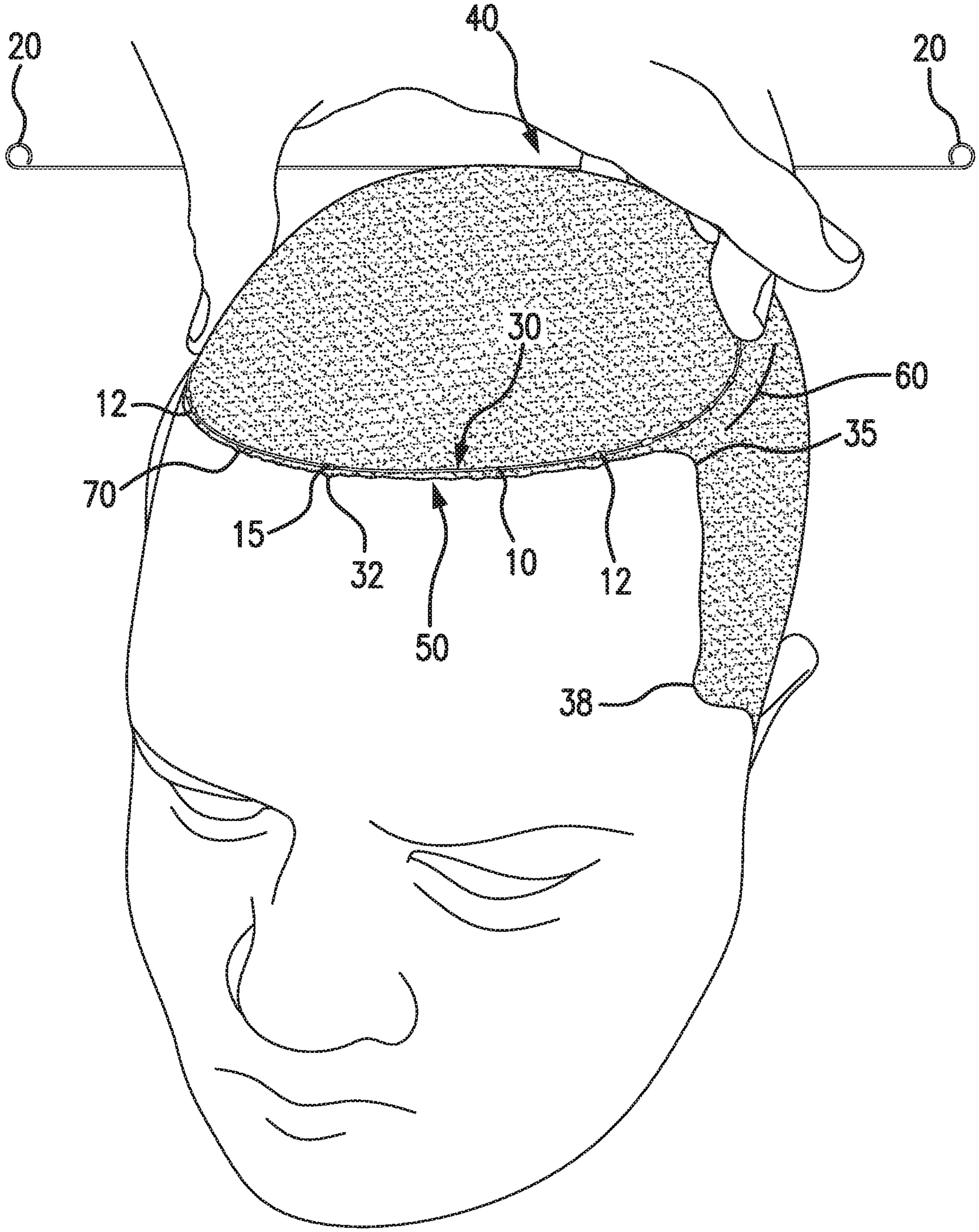
FIG. 3 shows an application of the invention to accurately reproduce a rounded forehead hairline.
Figure 4:
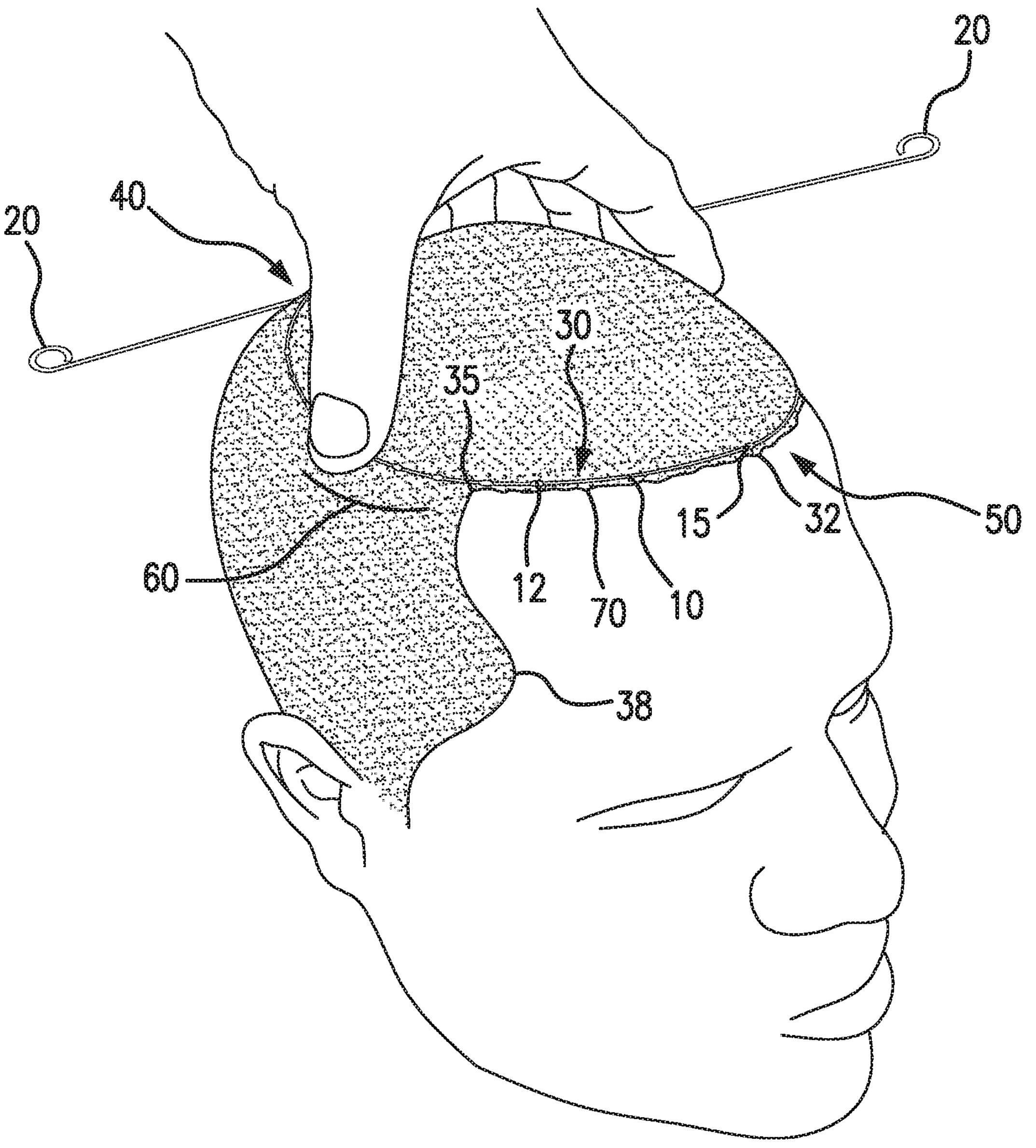
FIG. 4 shows another view of the application illustrated in FIG. 3.

In a further preferred embodiment via the method depicted in FIGS. 3-4, a barber places the head wire (10) around the forehead hairline (30) with the center reference mark (15) at a desired location—here, at the mid-frontal point (32) of the forehead hairline (30). The barber then ties the wire (10) into a loop at the back (40) of the customer's head to form a bow configuration (50). The bow (50) can then be loosened or tightened to fit the perimeter (60) of the customer's head. The wire (10) along the customer's forehead hairline (30) can then be adjusted to fit a desired shape—here, a round hairline shape. The marks (12) can also be used to measure the distance of the apexes of the front-temporal recesses (35) and the temporal points (38) from the mid-frontal point (32) to make sure they are the same distance so the hairline is equal and balanced on both sides of the customer's forehead. The barber can then hold the wire (10) in place on the client's head and cut any hair protruding out (70) under the wire (10) using a trimmer/clippers and following the outline created by the wire (10) along the client's forehead.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A haircutting guide wire, comprising:

a single wire having two unconnected distal free ends;

a loop formed solely by each unconnected distal free end of the wire, wherein each loop is free of any attachment;

a central mark placed at the midpoint of the wire; and a plurality of spacing marks extending along the wire on both sides of the central mark;

wherein the plurality of spacing marks includes a first left spacing mark along the wire to the adjacent left of the central mark and a first right spacing mark along the wire to the adjacent right of the central mark;

wherein the distance between the central mark and the first left spacing mark is more than one inch;

wherein the distance between the central mark and the first right spacing mark is more than one inch;

wherein the plurality of spacing marks to the left of the central mark are spaced equidistant apart from each other, wherein the equidistant spacing is less than one inch;

wherein the plurality of spacing marks to the right of the central mark are spaced equidistant apart from each other, wherein the equidistant spacing is less than one inch;

wherein the wire is capable of being positioned around a circumference of an individual's head and shaped such that the wire outlines a forehead hairline of the individual and independently holds its shape.

2. The guide wire of claim 1, wherein the wire is made of metal.

3. The guide wire of claim 1, wherein the central mark is formed by one of a notch, groove, thread, or bead.

4. The guide wire of claim 1, wherein the plurality of spacing marks is formed by one of notches, grooves, threads, or beads.

5. The guide wire of claim 1, wherein the distance between the central mark and the first left spacing mark is two inches, the distance between the central mark and the first right spacing mark is two inches, the equidistant spacing between the plurality of spacing marks to the right of the central mark is one-half inch, and the equidistant spacing between the plurality of spacing marks to the left of the central mark is one-half inch.

* * * * *